United States Patent [19]

Rim et al.

[11] 4,238,578

[45] Dec. 9, 1980

[54] ELASTOMER WITH IMPROVED HEAT AND OIL RESISTANCE BASED ON MODIFIED CHLORINATED POLYETHYLENE

[75] Inventors: Yong S. Rim, Woodbridge; Walter Nudenberg, Newtown; Robert Miller, Woodbridge; Phillip J. Cangelosi, Waterbury, all of Conn.

[73] Assignee: Uniroyal, Inc., New York, N.Y.

[21] Appl. No.: 40,783

[22] Filed: May 21, 1979

Related U.S. Application Data

[63] Continuation-in-part of Ser. No. 17,297, Mar. 5, 1979.

[51] Int. Cl.$^3$ .................. C08L 23/28; C08L 51/04
[52] U.S. Cl. ................... 525/309; 525/286; 525/292
[58] Field of Search .............. 525/309, 286, 292

[56] References Cited

U.S. PATENT DOCUMENTS

| | | | |
|---|---|---|---|
| 3,594,451 | 7/1971 | Keown | 525/309 |
| 3,644,579 | 2/1972 | Nakajima et al. | 525/309 |
| 3,819,763 | 6/1974 | Akane et al. | 525/309 |
| 3,890,407 | 6/1975 | Clayton et al. | 525/309 |
| 3,962,372 | 6/1976 | Arhart | 525/309 |

*Primary Examiner*—Carman J. Seccuro
*Attorney, Agent, or Firm*—James J. Long

[57] ABSTRACT

A chlorinated polyethylene elastomer or resin is modified by graft copolymerization with acrylic ester type of monomeric material, whose homopolymers have a glass transition temperature of not greater than 6° C., in an amount sufficient to provide an ester group (—COO—) content of from 25 to 40% by weight, to yield a mixed copolymerizate vulcanizable to a heat and oil resistant elastomeric state.

15 Claims, No Drawings

ELASTOMER WITH IMPROVED HEAT AND OIL RESISTANCE BASED ON MODIFIED CHLORINATED POLYETHYLENE

This application is a continuation-in-part of our commonly assigned copending application Ser. No. 17,297, filed Mar. 5, 1979.

This invention pertains to chlorinated polyethylene that has been modified by graft polymerization with acrylic ester type monomeric material to provide an improved elastomer.

The invention is especially directed to elastomers, which when properly compounded and vulcanized, are characterized by superior resistance to the deteriorating effects of exposure to high temperature and to oil.

More particularly this invention relates to new vulcanizable elastomers which are mixed polymerizates of (A) a spine which is a chlorinated polyethylene polymer; and, (B) acrylic ester type monomeric material graft copolymerized in the presence of (A).

Optionally, there may also be graft copolymerized in the presence of (A) and (B) a small amount of (C) different additional ethylenically unsaturated monomeric material which serves to enhance the vulcanizability of the copolymerizate.

There is a need for a rubber which has a wide range of service temperatures, for example, over the range of −25° F. to 350° F. Conventional butadiene-acrylonitrile, epichlorohydrin and chlorosulfonated polyethylene rubbers have good to moderate oil swell properties but their maximum service temperatures are generally under 300° F. Ever-rising temperatures under the hoods of automotive vehicles and other developments in the mechanical goods field have created a demand for more saitsfactory high temperature and oil resistant rubbers. Acrylate rubbers have these properties but their low temperature flexibility is poor and processing is often difficult; compression set (an important property for seals and mechanical goods) of acrylate rubbers is often too high. Certain known rubbers made by free radical high temperature and high pressure copolymerization of ethylene and methyl acrylate with small amounts of acrylic acid have good high temperatures resistance (up to 350° F.) and oil swell resistance (60% volume swell when immersed for 3 days in ASTM No. 3 oil at 300° F.), but the usefulness of these products is known to be limited because of their low viscosity, low green strength, as well as stickiness on the mill and tendency to stick in the mold thus making demolding difficult. The present invention is concerned with ameliorating the disadvantages of the various just-described prior art specialty rubbers.

U.S. Pat. No. 3,622,652, Hamed et al., Nov. 23, 1971, discloses grafting of certain acrylates and methacrylates onto olefin copolymer rubbers, but not chlorinated polyethylene and the proportion of acrylates is far below that employed in the present invention.

U.S. Pat. No. 3,981,958, Nakashima et al., Sept. 21, 1976, discloses grafts (on spines other than chlorinated polyethylene) of methacrylic ester moieties, particularly lower alkyl methacrylates which have a higher glass transition temperature than materials employed in the present invention.

U.S. Pat. No. 4,066,590, Eldred et al., Jan. 3, 1978, discloses olefin copolymer rubber compositins with improved heat and oil resistance made by vulcanizing in a mold a mixture of the rubber with 10-35 phr of one of the following: (a) trimethylolpropane trimethacrylate; (b) polyethylene glycol dimethacrylate; (c) ethylene glycol dimethacrylate; or (d) triallylcyanurate; plus 6 phr of halogenated organic compound, plus 10-25 phr zinc oxide, plus peroxide. The present entirely different composition is concerned with higher levels of ester content.

At the present stage of the art, specialty rubbers are being increasingly subjected to the two principal parameters of heat aging and fluid attack in many applications. In the automotive field, underhood temperatures now average over 120° C. resulting in the loss of physical properties of such components as tubing, seals, hoses, diaphrams, and the like. New fuel blends with higher contents of aromatic constituents further contribute to the degradation of physical properties of these components. Thus there is a need for specialty rubbers which will be serviceable in air and/or in contact with hydrocarbon oils at temperatures from −25° to +180° C. Rubbery polymerizates of this invention are capable of meeting these performance requirements.

In one aspect, the concept of the rubbery polymerizate of this invention resides in the finding that it is possible to combine the inherent oil and heat resistance of alkyl acrylate rubbers with the low temperature properties of chlorinated polyethylene polymer in spite of the fact that these two types of polymers are not compatible with each other.

It has now been found that it is possible to form rubbery polymerizates by graft copolymerizing, onto (A) a chlorinated polyethylene spine one or more acrylic monomers (B) as herein described, in an amount which is sufficient to provide an optimum degree of compatibility between the chlorinated polyethylene polymer and the acryllic polymer or copolymers which are formed simultaneously. The acrylic ester monomer or monomers (B) are selected in such proportions that the ester group (—COO—) content of the total copolymerizate is in the range of a minimum of 25% by weight to a maximum of 40% by weight.

Accordingly, in more detail, the invention is in one aspect directed to a mixed copolymerizate vulcanizable to an elastomeric state characterized by heat and oil resistance, comprising, by weight:

(A) a polymer spine which is chlorinated polyethylene;

(B) acrylic ester type monomeric material in an amount sufficient to provide an ester group (—COO—) content in the mixed copolymerizate of from 25 to 40% by weight comprising:

(a) alkyl acrylate monomeric material made up of one or more lower alkyl acrylate monomers in which the alkyl group has from 1 to 4 carbon atoms, and (b) 0 to 20 parts, per 100 parts by weight of lower alkyl acrylate (a), or a higher alkyl acrylate or methacrylate monomer in which the alkyl group has from 5 to 12 carbon atoms; and (C) 0 to 15 parts, per 100 parts by weight of polymer spine (A), of at least one additional different ethylenically unsaturated monomer which serves to enhance the vulcanizability of the copolymerizate, the said (B) and (C) being graft copolymerized in the presence of the rubber spine (A). Examples of such modifying monomers (C) are vinyl acetate, methacrylic acid and chloroethyl vinyl ether which are remarkably effective in amounts up to 15 parts per 100 parts by weight of spine polymer (A), as well as allyl glycidyl ether which gives outstanding results in amounts of 2 to 10 parts per 100 parts by weight of (A).

The chlorinated polyethylene employed as the spine polymer (A) in preparing the graft copolymer composition of the invention is one whose degree of chlorination, i.e., chlorine content, is 15–50% by weight, and preferably 20–45% by weight. Such chlorinated polyethylenes are characterized as either elastomeric or resinous materials.

The acrylic ester type monomeric material (B) which is graft copolymerized on the polymer spine (A) to make the mixed copolymerizate of the invention is based on monomers whose homopolymers have a relatively low glass transition temperature (Tg), that is, a Tg not greater than 6° C., as represented by one or more alkyl acrylate esters. Ordinarily the acrylic material (B) is made up of at least one lower alkyl acrylate (a) in which the alkyl group has from 1 to 4 carbon atoms and optionally from 0 to 20 parts [per 100 parts by weight of lower alkyl acrylate (a)] of a higher alkyl acrylate or methacrylate monomer (b) in which the alkyl group has from 5 to 12, preferably 5 to 8, carbon atoms. In some cases (a) is a mixture of methyl acrylate with another lower alkyl acrylate whose homopolymer has a Tg of less than 0° C.

Furthermore, the higher the proportion of acrylate used, the higher will be the oil resistance of the compounded and cured mixed copolymerizate. In this respect, methyl acrylate, at the same equivalent weight, provides the highest oil resistance of the $C_1$ to $C_4$ alkyl acrylates. However, at very high proportions of methyl acrylate, the mixed copolymerizate will tend to become leather-like at room temperature. This lack of low temperature flexibility can be overcome by the inclusion of an appropriate amount of a slightly higher (i.e., $C_2$ to $C_4$)alkyl acrylate which not only supplies low temperature flexibility but also enhances oil resistance of the vulcanized mixed graft copolymerizate. It is to be noted that the oil resistance of the graft copolymer vulcanizates depend on the grafted monomer in the order of methyl acrylate > ethyl acrylate > propyl acrylate > butyl acrylate.

Thus, exemplary of the $C_1$–$C_4$ alkyl acrylates that are used singly or in admixture in monomeric component (a) are:

|  | Tg of Homopolymer, °C. |
| --- | --- |
| methyl acrylate | +6 |
| ethyl acrylate | −24 |
| propyl acrylate | −45 |
| n-butyl acrylate | −55 |
| sec-butyl acrylate | −20 |
| isobutyl acrylate | −43 |
| tert-butyl acrylate | −22 |

It is to be noted that in the above serices of acrylates, the larger the alkyl group, the lower the resistance to oils and therefore the lower the amount of that comonomer which can ordinarily be used in order to maintain a given level of oil resistance.

Certain other acrylic-type esters may be used as the optional component (b) in minor amount, i.e., up to 20 parts or more, usually at least 2 parts, preferably 2 to 15 parts by weight per 100 parts by weight of (a) along with the aforementioned $C_1$–$C_4$ alkyl acrylates. These can be, as indicated above, $C_5$ to $C_{12}$, preferably $C_5$ to $C_8$, or higher alkyl acrylates, alkyl methacrylates, or mixtures thereof.

Exemplary of the $C_5$–$C_{12}$ or higher alkyl acrylates used in component (b) are 3-pentyl acrylate, 3-methylbutyl acrylate, 2-methylbutyl acrylate, 3-methylbutyl acrylate, 2-methylpentyl acrylate, 2-ethylbutyl acrylate, 4-methyl-2-pentyl acrylate, n-heptyl acrylate, 2-heptyl acrylate, n-octyl acrylate, 2-octyl acrylate, 2-ethylhexyl acrylate, n-nonyl acrylate, 5-ethyl-2-nonyl acrylate, and the methacrylate analogues of the aforementioned acrylates.

Ordinarily the amount of lower alkyl acrylate material (a) falls within the range of from 80 to 300 parts, while the amount of higher alkyl acrylate or methacrylate material (b) frequently falls within the range of from 0 to 20 parts, per 100 parts by weight of (A).

The grafting monomer or monomer mixture preferably further contains a minor amount, i.e. up to 15 parts or more, usually at least 2 parts, preferably 2 to 10 parts by weight [per 100 parts by weight of polymer spine (A)], of at least one different additional ethylenically unsaturated monomer (C) which, during the grafting reaction, is believed to be incorporated into the polyacrylic side chains and functions to provide vulcanization sites for the subsequent cure of the rubbery graft copolymerizate.

Exemplary of these ethylenically unsaturated monomers (C) there may be mentioned;

(i) monomers containing a hydrogen atom in an alpha position to an aliphatic ether oxygen as exemplified by allyl glycidyl ether, vinyl ethyl ether, vinyl propyl ether, vinyl butyl ether in addition to the alkoxyalkyl acrylates such as methoxymethyl acrylate, methoxyethyl acrylate, ethoxyethyl acrylate, n-butoxyethyl acrylate, ethoxypropyl acrylate, and the like, or such monomers as acrylates containing functional groups as exemplified by glycidyl acrylate, furfuryl acrylate, tetrahydrofurfuryl acrylate, N,N-dimethylaminoethyl acrylate, N,N-dimethylaminoethyl acrylate, 2-cyanoethyl acrylate, allyl acrylate and methacrylate analogues thereof.

(ii) monomers containing a hydrogen atom in an alpha position to a carbonyl group as exemplified by vinyl acetate, methyl vinyl ketone, dimethyl fumarate, diethyl fumarate, diethyl maleate, dipropyl maleate, and the like.

(iii) monomers containing a benzylic hydrogen as exemplified by benzyl acrylate, 2-phenyl ethyl acrylate and beta-phenoxyethyl acrylate;

(iv) monomers containing an active halogen, wherein the halogen may be chlorine, bromine or iodine and may be of either one of two types, namely halogen-containing vinylidene hydrocarbons or halogen-containing vinyl monomers having the halogen group at least 2 carbon atoms removed from an oxygen atom.

Exemplary of halogen-containing vinylidene hydrocarbons are allyl chloride, methallyl chloride, vinyl chloride, vinylidene chloride, vinyl benzyl chloride, vinyl benzyl bromide, 5-chloromethyl-2-norbornene. 5-bromomethyl-2-norbornene, 5-beta-chloroethyl-2-norobornene, and the like. The second type of monomer, i.e., those having the halogen group at least 2 carbon atoms removed from an oxygen atom, are characterized by having either (—O—), ketone

or ester

structures in the monomer where the halogen group is at least 2 carbon atoms and up to 6 or more carbon atoms removed from an oxygen atom. Examples of these monomers are halogen-containing vinyl esters such as vinyl chloroacetate, vinyl bromoacetate, allyl chloroacetate, vinyl 3-chloropropionate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogen-containing vinyl ethers such as 2-chloroethyl vinyl ether, halogen-containing vinyl ketones such as chloromethyl vinyl ketone, 2-chloroethyl vinyl ketone, and the like: and 5-chloroacetoxymethyl-2-norbornene, 5-(alpha, beta-dichloropropionylmethyl)-2-norbornene, and the like.

The more preferred halogen-containing monomers are vinyl benzyl chloride, 5-chloromethyl-2-norbornene, vinyl chloroacetate, 2-chloroethyl acrylate, and 5-(alpha-chloroacetoxymethyl)-2-norbornene.

Due to availability and cost, the chlorine-containing monomers are preferred.

(v) monomers containing carboxyl groups as exemplified by $C_1$-$C_5$ alkyl methacrylic acids, acrylic acid, mono $C_1$-$C_5$ alkyl esters of fumaric acid as exemplified by ethyl hydrogen maleate, methyl hydrogen fumarate, and cinnamic acid and the like.

Preferred monomers (C) for enhancing the vulcanizability of the graft copolymerizate are those selected from the group consisting of methoxyethyl acrylate, ethoxyethyl acrylate, n-butoxyethyl acrylate, butoxyethoxyethyl acrylate, glycidyl acrylate, furfuryl acrylate, tetrahydrofurfuryl acrylate, phenoxyethyl acrylate, N,N-dimethylaminoethyl acrylate, N,N-diethylaminoethyl acrylate, 2-chloroethyl acrylate, 3-chloroethyl acrylate, 2-cyanoethyl acrylate, alkyl acrylate, methallyl acrylate, the methacrylate analogs of the aforementioned acrylates, allyl glycidyl ether, allyl maleate, allyl fumarate, allyl phthalate, butadiene, isoprene, 4-vinylcyclohexene, dicyclopentadiene, ethylidene norbornene, 1,4-hexadiene, 1,5-hexadiene, vinyl acetate, 2-chloroethyl vinyl ether, vinyl benzyl chloride, vinyl alpha-chloroacetate, and acrylic acid.

As stated above, the mixed copolymerizates of the invention are made by polymerizing the monomer or monomer mixture (B) and, optionally, (C), in the presence of the chlorinated polyethylene (A) with the result that a part of the newly-polymerized monomers of the monomeric mixtures are believed to be attached to the spine polymer molecules. Any suitable conventional graft polymerization method may be used for making the mixed polymerizate of this invention, for example, as described in U.S. Pat. Nos. 3,489,821, Witt et al., Jan. 13, 1970; 3,489,822, Witt et al., Jan. 13, 1970; 3,642,950, O'Shea, Feb. 15, 1972 or 3,819,765, O'Shea, Jan. 25, 1974. Other methods of making the mixed copolymerizate may be used, for example, irradiation of the spine polymer with high-energy electromagnetic or particulate radiation (gamma rays, beta rays, neutron rays, etc.) and simultaneously or subsequently contacting the polymer with the monomer or monomeric mixture.

The graft copolymer composition of the invention resulting from polymerization of the monomer or monomer mixture (B), or (B) and (C), in the presence of the chlorinated polyethylene spine (A) as described herein is remarkable for its good processing characteristics. It can be milled and extruded, and otherwise processed like a conventional rubber. It is most useful for making crosslinked or vulcanized articles, and for this purpose it may be compounded with various conventional rubber compounding ingredients, including fillers such as carbon black, silica, etc., vulcanizing or cross-linking agents, notably peroxides and those co-agents normally included to assist in peroxide vulcanization, plasticizers, antioxidants, etc., all in suitable conventional amounts. Vulcanization may be carried out as in ordinary practice for rubber goods, the time and temperature of vulcanization being generally inversely related and being dependent on such factors as the kind and amount of curing agent, the presence or absence of co-curing agents or activating substances, the size and shape of the article being manufactured, the character of the heating device, and other variables whose effects are well understood in the art.

Exemplary of coagents that are used to assist in the peroxide vulcanization of the mixed copolymerizates of this invention are: triallylisocyanurate, triallylcyanurate, N, N'-m-phenylene dimaleimide, ethyleneglycoldimethacrylate, 1,3-butylideneglycoldimethacrylate, trimethylolpropane trimethacrylate, trimethylolpropane triacrylate, triallylmellitate, and the like.

Conventional plasticizers or softeners may be used as one of the compounding ingredients for the mixed copolymerizates of this invention. The type of plasticizer that is used should be compatible with either the rubbery spine, the ungrafted polyacrylate or preferably both the spine and the polyacrylate. Preferably, the plasticizer should have a freezing point not higher than about 15° C. with a flash point of at least 175° C. for most applications requiring exposures to elevated temperatures for extended periods of time.

The plasticizers that may be used in the polymerizates of this invention are preferably those of the polyester type as typified by Paraplex G-25 (trademark), Paraplex G-62 (trademark) and the like.

The stabilizers that may be used in conjunction with the peroxide cure of the rubbery polymerizates of this invention are those types of stabilizers that do not interfere with the peroxide cross-linking reacgion. The types of stabilizers may include the phenolic and amine type which are well known in the art.

Exemplary peroxide-type vulcanizing agents that may be used for crosslinking the rubbery polymerizates of this invention include: dicumyl peroxide, 1,3-bis(tert-butylperoxyisopropyl)benzene, 2,5-dimethyl-2,5(di-tert-butylperoxy)hexane, 2,5-dimethyl-2,5(di-tert-butyl(peroxy) hexyne-3, n-butyl 4,4-bis(tert-butylperoxy)valerate, di-tert-butyl peroxide, tert-butyl perbenzoate, 2,5-dimethyl-2,5-bis(benzoylperoxy) hexane, 1,1-bis(tert-butylperoxy-3,3,5-trimethyl)cyclohexane, and alpha, alpha'-bis(tert-butylperoxy)diisopropylbenzene.

The peroxide cure is preferred since it provides cured vulanizates that have superior heat aging characteristics. Combined curatives such as peroxide and diamine or peroxide and sulfur are also of interest depending upon the choice of monomer which is present in a minor amount.

The crosslinked or vulcanized, rubbery, copolymerizates of this invention, with varying fillers, typically exhibit a volume swell of about 15 to 40% when exposed to ASTM #3 oil for 70 hours at 300° F. as measured in accordance with ASTM D-471-75. Moreover, these elastomers exhibit excellent aging of such physical properties as modulus at 100% elongation, tensile strength and elongation at break upon exposure to air for 3 days at 330° F. as well as exposure to air for 3 days at 350° F.

A typical polymerization recipt used in this invention employs a chlorinated polyethylene/methyl acrylate/ethyl acrylate or a chlorinated polyethylene/methyl acrylate/ethyl acrylate/ethoxyethyl acrylate/allyl glycidyl ether in the ratio of 100/120/80 or 100/120/80/8/4. The methyl acrylate/ethyl acrylate is determined largely by the need to achieve a combination of good oil swell resistance and good low temperature properties.

The following example will serve to illustrate the practice of the invention in more detail.

EXAMPLE

A series of graft copolymerizates are prepared, using the polymerization formulas shown in Table I, Parts A, B and C, below, wherein the quantities are expressed in parts by weight. In Table I, CPE 3614 (trademark) is chlorinated polyethylene having a chlorine content of 35% by weight and a melt viscosity (poise/1000) of 21. Methocel K4M (trademark) is hydroxypropyl methylcellulose, mol. wt. 56,000. Methocel K100 (trademark) is hydroxypropyl methylcellulose, mol. wt. 26,000. CMD-0136 (trademark) is chlorinated polyethylene elastomer having a chlorine content of 36%. Lupersol 10 (trademark) is t-butylperoxy neodecanoate. Lupersol 11 (trademark) is t-butylperoxy pivalate. The procedure involving the use of chlorined polyethylene CM-0136 in crumb form (¼ inch mesh size) is as follows:

To a pressure reactor equipped with a stirrer is charged water, CM-0136, Methocel K-100 or Methocel K-4M (as 2% aqueous solutions) and sodium nitrite with stirring at room temperature. To the reactor is then added methyl acrylate, ethyl acrylate, ethoxyethyl acrylate, allyl glycidyl ether or other unsaturated monomers, cyclohexane and Lupersol 10 (or 11), all of the components having been premixed prior to addition to the reactor. The reaction mixture is then heated to 115°–120° F. for two hours with stirring (soak time) to allow the chlorinated polyethylene to absorb the monomer mixture. The reaction mixture is then polymerized by raising the temperature to 175° for 3 hours with continued stirring after which the reaction mixture is cooled to room temperature, drained and washed with water followed by drying at about 120°–150° F. in an air oven for two days.

A similar procedure as described above is used when CM-0136 elastomer in powder form is employed except that no sodium nitrite is incorporated into the reactor in the initial charge and no cyclohexane is required in the premix with the various monomers and Lupersol 11 which are then added to the reactor. Further, no soak time is required. The polymerization temperature and time of reaction, cooling of the reaction mixture to room temperature followed by draining, washing and drying are carried out as previously described.

Table II, Parts A, B and C, compound recipes employing the graft polymers from Table I, along with the various compounding ingredients, i.e., filler, plasticizer, stabilizer and curing agent, in the respective recipes expressed in parts by weight. In Table II, Paraplex G-25 (trademark) is a high molecular weight polyester, sp. gr. 1.06, viscosity at 25° C. about 2200 poises. Santicizer 79TM (trademark) is a high molecular weight trimellitate ester. Paraplex G-62 (trademark) is a soybean oil epoxide. Naugard Q (trademark) is polymerized 1,2-dihydro-2,2,4-trimethylquinoline-TAIC stands for triallylisocyanurate. SR351 (trademark) is triallyl trimethylolpropane. Acrawax C (trademark) is N,N'-ethylene bis(stearamide). TAC stands for triallyl cyanurate. Age Rite White (trademark) is symmetrical di-beta-naphthyl-p-phenylenediamine. DiCup 40E (trademark) is dicumyl peroxide on clay, peroxide content 39.5 to 41.5%. Percadox 17/40 (trademark) is a 40% n-butyl-4,4-bis(t-butylperoxy) valerate. These vulcanizable formulations are mixed in conventional rubber equipment employing the upside-down technique for mixing in the Banbury, a method well known in the art of rubber technology, with the stock temperature not exceeding 220° F. Total time of mixing is 5 minutes. The mix is then transferred to a two roll rubber mill for blending and then is sheeted off for curing in a mold under pressure at 320° F. for the times as shown in Table II.

Table III, Parts A, B and C, shows the physical properties of the resulting vulcanizates, unaged and aged, determined according to the following ASTM test procedures:

| | |
|---|---|
| Shore (A) hardness | ASTM D-2240-75 |
| Tensile strength, psi | ASTM D-412-75 |
| 100% modulus, psi | ASTM D-412-75 |
| 200% modulus, psi | ASTM D-412-75 |
| Elongation, % | ASTM D-412-75 |
| Stiffness (Torsional modulus-Gehman T10 and T100) | ASTM D-1053-73 |

As judged from the data in Table III the vulcanized rubber copolymerizates of this invention exhibit excellent air aging data with respect to such physical properties as modulus at 100% elongation, tensile strength and elongation at break after exposure to air for 70 hours at 330° F. as well as exposure to air for 70 hours at 350° F. It is further noted that all formulations exhibit a % volume swell after 70 hours at 300° F. in ASTM #3 oil varying from 23 to 36 as measured in accordance with ASTMD-471-75. The vulcanizates also show excellent low temperature flexibility properties as well as moderately low compression set after 70 hours at 300° F. Thus, it can be seen that the graft copolymerizates of the instant invention exhibit significantly improved heat and oil resistance in addition to possessing good low temperature flexibility over rubbers which are available in the commercial market today.

TABLE I

| | | Graft Copolymerization Formulas | | | | | | | | | |
|---|---|---|---|---|---|---|---|---|---|---|---|
| | | Part A | | | | Part B | | | | Part C | | |
| | Run: | 1 | 2 | 3 | 4 | 5 | 6 | 7 | 8 | 9 | 10 | 11 |
| Reactor Size, Gal. | | 10 | 150 | 10 | 10 | 10 | 150 | 150 | 5 | 5 | 10 | 10 |
| Water | | 450 | 450 | 450 | 450 | 450 | 450 | 450 | 450 | 450 | 350 | 450 |
| Cyclohexane | | 10 | 10 | 10 | 10 | — | — | — | — | 10 | 10 | 5 |

TABLE I-continued

| | | Graft Copolymerization Formulas | | | | | | | | | |
|---|---|---|---|---|---|---|---|---|---|---|---|
| | | Part A | | | | Part B | | | | Part C | |
| | Run: | 1 | 2 | 3 | 4 | 5 | 6 | 7 | 8 | 9 | 10 | 11 |
| CPE 3614 | | — | — | — | — | — | — | — | — | 50 | — | — |
| Methocel K4M | | — | — | — | — | — | — | — | — | 0.15 | — | — |
| Methocel K100 | | 0.03 | 0.03 | 0.03 | 0.03 | 0.01 | 0.0015 | 0.002 | — | — | 0.05 | 0.02 |
| CMO-0136 (crumb) | | 50 | 50 | 50 | 50 | 50 | — | — | 50 | — | 50 | 50 |
| CMO-0136 (powder) | | — | — | — | — | — | 50 | 50 | — | — | — | — |
| Sodium nitrite | | 0.1 | 0.1 | 0.1 | 0.1 | 0.1 | — | — | — | 0.1 | 0.1 | 0.1 |
| Methyl acrylate | | 60 | 60 | 60 | 60 | 60 | 60 | 62 | 60 | 60 | 60 | 60 |
| Ethyl acrylate | | 40 | 40 | 40 | 40 | 40 | 40 | 42 | 40 | 40 | 40 | 40 |
| Allyl chloride | | — | — | — | — | — | — | — | — | — | — | 4 |
| Ethoxyethyl acrylate | | — | 4 | 4 | — | 4 | 4 | — | 4 | 4 | 4 | 4 |
| Allyl glycidyl ether | | — | 2 | 2 | 6 | 2 | — | — | 2 | 2 | 2 | 4 |
| Lupersol 10 | | — | — | — | — | — | — | — | 6 | — | — | — |
| Lupersol 11 | | 3 | 3 | 6 | 3 | 3 | 3 | 3 | — | 6 | 6 | 3 |
| Temp. of soak, °F. | | 110 | 115 120 | 108 | 108 | 120 | — | — | 108 | 108 | 108 | 120 |
| Time of soak, hr. | | 2 | 2 | 3 | 2 | 2 | — | — | 3 | 2 | 3 | 2 |
| Polymerization temp °F. | | 160 | 175 | 158 | 160 | 180–185 | 175 | 175 | 158 | 148 | 158 | 175 |
| Polymerization time, hr. | | 4 | 3 | 4 | 4 | 3 | 3 | 3 | 4 | 4 | 4 | 2 |
| Yield, % | | 100 | 100 | 99 | 98 | 96 | 98 | 99 | 96 | 99 | 99 | 96 |

TABLE II

| | | Compound Recipes | | | | | | | | | |
|---|---|---|---|---|---|---|---|---|---|---|---|
| | | Part A | | | | Part B | | | | Part C | |
| | Run: | 1 | 2 | 3 | 4 | 5 | 6 | 7 | 8 | 9 | 10 | 11 |
| Graft polymer | | 100 | 100 | 100 | 100 | 100 | 100 | 100 | 100 | 100 | 100 | 100 |
| SRF carbon black | | 70 | 70 | 70 | 80 | — | 70 | 70 | 80 | 80 | 70 | 70 |
| FED carbon black | | — | — | — | — | 70 | — | — | — | — | — | — |
| Magnesium oxide | | 10 | 5 | 5 | 10 | 5 | 10 | 5 | 10 | 10 | 5 | 5 |
| Paraplex G-25 | | 10 | 10 | 10 | 10 | 10 | 10 | 10 | 20 | 5 | 10 | 10 |
| Santicizer 79TM | | 10 | 5 | 5 | — | 10 | 10 | 10 | — | — | 10 | 10 |
| Paraplex G-62 | | — | — | — | — | — | — | — | — | 15 | — | — |
| Naugard Q | | 2 | 2 | 2 | 2 | 2 | 2 | 2 | 1 | 1.5 | 2 | 2 |
| TAIC | | 2 | 2 | 2 | 2 | 2 | — | — | — | — | 2 | 2 |
| SR351 | | — | — | — | — | — | — | — | 2 | 4 | — | — |
| Acrawax C | | — | — | — | — | — | 1 | — | — | — | — | — |
| TAC | | — | — | — | — | — | 2 | 2 | — | — | — | — |
| Age Rite White | | — | — | — | — | — | — | — | 1 | — | — | — |
| Antimony trioxide | | 5 | 5 | 5 | 5 | 5 | 5 | 10 | — | — | 5 | 5 |
| DiCup 40KE | | 4 | 4 | 4 | 4 | 4 | 4 | 4 | 4 | 4 | 4 | 4 |
| Percadox 17/40 | | 4 | 3 | 3 | 2 | 4 | 4 | 4 | 4 | 4 | 2 | 4 |
| Cure conditions | | | | | | | | | | | | |
| Temp. °F. | | 320 | 320 | 320 | 320 | 320 | 320 | 320 | 320 | 320 | 320 | 320 |
| Time, min. | | 60 | 60 | 60 | 60 | 60 | 60 | 40 | 20 | 60 | 60 | 60 |

TABLE III

| | | Vulcanizate Properties | | | | | | | | | |
|---|---|---|---|---|---|---|---|---|---|---|---|
| | | Part A | | | | Part B | | | | Part C | |
| | Run: | 1 | 2 | 3 | 4 | 5 | 6 | 7 | 8 | 9 | 10 | 11 |
| Unaged | | | | | | | | | | | | |
| Tensile, psi | | 1180 | 1290 | 1330 | 1310 | 1200 | 1370 | 1350 | 1140 | 1010 | 1120 | 950 |
| 100% Modulus, psi | | 520 | 610 | 620 | 930 | 440 | 540 | 490 | 720 | 600 | 320 | 300 |
| % Elongation | | 270 | 280 | 250 | 210 | 280 | 280 | 310 | 240 | 230 | 330 | 260 |
| Hardness, Shore A | | 70 | 72 | 75 | 86 | 70 | 75 | 74 | 71 | 72 | 64 | 67 |
| Tear (Die C), pli | | 116 | 132 | 131 | 159 | 125 | 142 | 119 | 160 | 188 | 140 | 110 |
| Gehman, T100 °C. | | −33 | −27 | −22 | −17 | — | −30 | −18 | −24 | — | — | — |
| Compression set after 70 hours at 300° F. | | 52 | 63 | 57 | 66 | 53 | 53 | 54 | — | — | 56 | 65 |
| % Swell, ASTM #3 oil after 70 hours at 300° F. | | 35 | 28 | 31 | 36 | 27 | 23 | 24 | 30 | 35 | 25 | 26 |
| Aged 70 hrs. at 330° F. | | | | | | | | | | | | |
| Tensile, psi | | 1630 | 1940 | 1840 | 2010 | 1580 | 1950 | 1710 | 1790* | 1550* | 1260* | 1600 |
| 100% Modulus, psi | | 1430 | 1830 | 1660 | — | 1260 | 1770 | 1610 | 1680 | 1400 | 820 | 1420 |
| % Elongation | | 160 | 130 | 150 | 100 | 170 | 140 | 120 | 120 | 130 | 240 | 180 |
| Hardness, Shore A | | 92 | 90 | 93 | 90 | 87 | 92 | 89 | 92 | 90 | 83 | 90 |
| Aged 70 hrs. at 350° F. | | | | | | | | | | | | |
| Tensile, psi | | 1790 | 1670 | 1910 | — | 1600 | — | — | — | — | — | 1610 |
| 100% Modulus, psi | | 1720 | 1560 | 1800 | — | 1600 | — | — | — | — | — | 1590 |
| % Elongation | | 110 | 120 | 120 | — | 110 | — | — | — | — | — | 130 |
| Hardness, Shore A | | 93 | 89 | 94 | — | 90 | — | — | — | — | — | 93 |

*Aging temp. 320° F.

What is claimed is:

1. A mixed copolymerizate vulcanizable to an elastomeric state characterized by heat and oil resistance comprising:
   (A) a chlorinated polyethylene polymer spine; and
   (B) at least one acrylic ester monomer graft copolymerized in the presence of (A) in an amount sufficient to provide an ester group content (—COO—) in the mixed copolymerizate of from 25 to 40% by weight, said acrylic ester monomer being one whose homopolymer has a glass transition temperature of not greater than 6° C.

2. A mixed copolymerizate vulcanizable to an elastomeric state characterized by heat and oil resistance, comprising:
   (A) a spine polymer which is a chlorinated polyethylene containing from 15 to 50% chlorine by weight;
   (B) acrylic ester monomer in an amount sufficient to provide an ester group (—COO—) content in the mixed copolymerizate of from 25 to 40% by weight comprising:
      (a) alkyl acrylate monomeric material made up of one or more lower alkyl acrylate monomers in which the alkyl group has from 1 to 4 carbon atoms;
      (b) 0 to 20 parts, per 100 parts by weight of lower alkyl acrylate (a), of a higher alkyl acrylate or methacrylate monomer in which the alkyl group has from 5 to 12 carbon atoms; and
   (C) 0 to 15 parts, per 100 parts by weight of the spine (A), of at least tone additional different ethylenically unsaturated monomer which serves to enhance the vulcanizability of the copolymerizate, the said (B) and (C) being graft copolymerized in the presence of the spine polymer (A).

3. A mixed copolymerizate as in claim 2 in a vulcanized, elastomeric state.

4. A mixed copolymerizate as in claim 2 in which the amount of (b) is from 2 to 15 parts per 100 parts by weight of (a) and the amount of (C) is from 2 to 10 parts per 100 parts by weight of (A).

5. A mixed copolymerizate as in claim 4 in which (C) is selected from the group consisting of methoxyethyl acrylate, ethoxyethyl acrylate, n-butoxyethyl acrylate, butoxyethoxylethyl acrylate, glycidyl acrylate, furfuryl acrylate, tetrahydrofurfuryl acrylate, phenoxyethyl acrylate, N,N-dimethylaminoethyl acrylate, N,N-diethylaminoethyl acrylate, 2-chloroethyl acrylate, 3-chloroethyl acrylate, 2-cyanoethyl acrylate, alkyl acrylate, methallyl acrylate, the methacrylate analogs of the aforementioned acrylates, allyl glycidyl ether, allyl maleate, allyl furmarate, allyl phthalate, butadiene, isoprene, 4-vinylcyclohexene, dicyclopentadiene, ethylidene norobornene, 1,4-hexadiene, 1,5-hexadiene, vinyl acetate, 2-chloroethyl vinyl ether, vinyl benzyl chloride, vinyl alpha-chloroacetate, and acrylic acid.

6. A mixed copolymerizate as in claim 1 or 5 in which (a) comprises methyl acrylate.

7. A mixed copolymerizate as in claim 1 or 5 in which (a) comprises ethyl acrylate.

8. A mixed copolymerizate as in claim 1 or 5 in which (a) comprises butyl acrylate.

9. A mixed copolymerizate as in claim 1 or 5 in which (a) comprises a mixture of methyl acrylate with ethyl or butyl acrylate.

10. A mixed copolymerizate as in claim 1 or 5 in which (b) is 2-ethylhexyl acrylate.

11. A mixed copolymerizate as in claim 1 or 5 in which (C) is ethoxyethyl acrylate.

12. A mixed copolymerizate as in claim 1 or 5 in which (C) is vinyl acetate.

13. A mixed copolymerizate as in claim 1 or 5 in which (C) is ethoxyethyl acrylate and allyl glycidyl ether.

14. A mixed copolymerizate as in claims 5 or 11 in which (C) is vinyl acetate and allyl glycidyl ether.

15. A mixed copolymerizate as in claims 1 or 5 in which (C) is vinylbenzyl chloride and 2-chloroethyl vinyl ether.

* * * * *